United States Patent
Chen

(10) Patent No.: US 9,371,605 B2
(45) Date of Patent: Jun. 21, 2016

(54) METHOD FOR MANUFACTURING CONDUCTIVE FABRIC

(71) Applicant: Wai Tai Technology Co., Ltd., Kaohsiung (TW)

(72) Inventor: Hung-Jen Chen, Kaohsiung (TW)

(73) Assignee: WAI TAI TECHNOLOGY CO., LTD., Kaohsiung (TW)

(*) Notice: Subject to any disclaimer, the term of this patent is extended or adjusted under 35 U.S.C. 154(b) by 331 days.

(21) Appl. No.: 14/196,902

(22) Filed: Mar. 4, 2014

(65) Prior Publication Data

US 2014/0182097 A1    Jul. 3, 2014

Related U.S. Application Data

(63) Continuation-in-part of application No. 13/273,761, filed on Oct. 14, 2011, now abandoned.

(51) Int. Cl.
| | | |
|---|---|---|
| *D04H 1/498* | (2012.01) | |
| *D04H 1/485* | (2012.01) | |
| *D04H 13/00* | (2006.01) | |
| *D04H 1/54* | (2012.01) | |
| *D04H 1/492* | (2012.01) | |
| *B32B 5/02* | (2006.01) | |
| *B32B 5/26* | (2006.01) | |
| *B32B 7/08* | (2006.01) | |
| *B32B 3/16* | (2006.01) | |
| *B32B 3/26* | (2006.01) | |

(52) U.S. Cl.
CPC *D04H 1/485* (2013.01); *B32B 3/16* (2013.01); *B32B 3/26* (2013.01); *B32B 5/022* (2013.01); *B32B 5/024* (2013.01); *B32B 5/26* (2013.01); *B32B 7/08* (2013.01); *D04H 1/492* (2013.01); *D04H 1/498* (2013.01); *D04H 1/5405* (2013.01); *D04H 13/002* (2013.01); *D04H 13/005* (2013.01); *B32B 2307/202* (2013.01); *B32B 2457/00* (2013.01)

(58) Field of Classification Search
CPC ..... D04H 13/002; D04H 13/005; D04H 1/46; D04H 1/498; Y10T 442/339; Y10T 442/3463; Y10T 442/348; Y10T 442/655; Y10T 442/662
See application file for complete search history.

(56) References Cited

U.S. PATENT DOCUMENTS

| | | | |
|---|---|---|---|
| 1,456,223 A | | 5/1923 | Craddick et al. |
| 3,431,611 A | | 3/1969 | Rentz |
| 3,656,177 A | * | 4/1972 | Chung .................... G06F 17/50 28/107 |
| 3,745,301 A | | 7/1973 | Sherrill et al. |
| 4,725,717 A | | 2/1988 | Harrison |
| 4,777,706 A | * | 10/1988 | Stanislaw ............... D04H 18/02 28/110 |
| 4,891,870 A | * | 1/1990 | Muller ................... D04H 18/02 28/107 |
| 6,078,026 A | | 6/2000 | West |
| 6,545,253 B2 | | 4/2003 | Lin et al. |
| 2009/0197037 A1 | * | 8/2009 | Chen ..................... D04H 13/002 428/102 |
| 2012/0023718 A1 | * | 2/2012 | Chen ..................... D04H 13/002 28/104 |

\* cited by examiner

*Primary Examiner* — Andrew Piziali

(74) *Attorney, Agent, or Firm* — Muncy, Geissler, Olds & Lowe, P.C.

(57) ABSTRACT

A method for manufacturing a conductive fabric is undertaken via a fixing device which has a plurality of working sections. According to an arrangement of the conductive yarn disposed between a first flexible base and a second flexible base, the working sections of the fixing device are extended to form a plurality of fixing points and the other working sections are retracted without forming the fixing points, thereby fixing the conductive yarn between the first and second flexible bases with a dot-like spaced pattern to obtain conductive fabric products having different conductive yarn arrangements without replacing the fixing device.

6 Claims, 13 Drawing Sheets

METHOD FOR MANUFACTURING CONDUCTIVE FABRIC

This application is a continuation-in-part, and claims priority, of from U.S. patent application Ser. No. 13/273,761 filed on Oct. 14, 2011, entitled "METHOD FOR MANUFACTURING A CONDUCTIVE FABRIC AND PRODUCTS THEREOF", the entire contents of which are hereby incorporated by reference.

FIELD OF THE INVENTION

The present invention relates to a method for manufacturing conductive fabric. In the method, working sections of a fixing device are extended to form fixing points and the other working sections of the fixing device are retracted without forming the fixing points according to an arrangement of a conductive yarn between a first flexible base and a second flexible base, thereby fixing the conductive yarn between the first and second flexible bases with a dot-like spaced pattern. As such, without replacing the fixing device, a conductive fiber having different conductive yarn arrangements can be obtained.

BACKGROUND OF THE INVENTION

A conventional method to fabric a conductive fabric, referring to FIG. 1, generally is accomplished by direct knitting and weaving a conductive yarn 12 into a soft base 11. While such an approach can bind the conductive yarn 12 with the soft base 11, but the finished conductive fabric 10 is more expensive and production time is longer.

To remedy this problem, some producers try to sew conductive yarn 22 directly on a soft base 21 according to a preset layout to form a conductive fabric 20 (referring to FIG. 2). But the conductive yarn 22 could receive drastic friction during the sewing operation and be damaged or even rupture. The sewed conductive yarn 22 also easily loosens off and results in a lower quality of the conductive fabric 20.

FIGS. 3 and 4 show "Method for Forming Nonwoven Electric Blanket Shells" disclosed by the U.S. Pat. No. 3,431,611. In the method for forming nonwoven electric blank shells, two layers of non-woven fibrous materials 10A and 11A are needle-punched by a needle-punching mechanism 1A to provide parallel channels 12A which are spaced and in communication with one another to complete the nonwoven electric blank shell. Further, a heated yarn is connected to a shuttle. By manually operating the shuttle, the heated yarn is threaded through the parallel channels 12A to complete the non-woven electric blanket shell. However, such method is only capable of manufacturing parallel channels 12A having the same arrangement. To manufacture channels with different arrangements, it has to replace the needle-punching mechanism 1A having different arrangements of the punching needles 100A. Thus, not only costs but also manufacturing complications are increased as a large quantity of needle-punching mechanisms 1A with channels in different arrangements need to be manufactured.

SUMMARY OF THE INVENTION

Therefore the primary object of the present invention is to provide a method for manufacturing a conductive fabric that overcomes issues of the prior art.

It is an objective of the present invention to provide a method for manufacturing a conductive fabric. In the method, working sections of a fixing device are extended to form fixing points and the other working sections of the fixing device are retracted without forming the fixing points according to an arrangement of a conductive yarn between first and second flexible bases, thereby fixing the conductive yarn between the first and second flexible bases with a dot-like spaced pattern. As such, the conductive yarn is fixed between the first and second flexible bases to obtain the conductive fabric products having different conductive yarn arrangements without replacing the fixing device. For example, according to an arrangement of the conductive yarn between the upper and lower layers of a woven fabric, punching needles of a needle-punching device are extended to form fixing points and the other punching needles of the needle-punching device are retracted without forming the fixing points. Thus, the conductive yarn and the upper and lower layers of the woven fabric can be combined in a dot-like spaced pattern, thereby achieving conductive fabrics having different conductive yarn arrangements without replacing the fixing device.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Details of the present invention are given in the description below. It should be noted that, in the description below, similar elements are represented by the same denotations.

Figure 1:
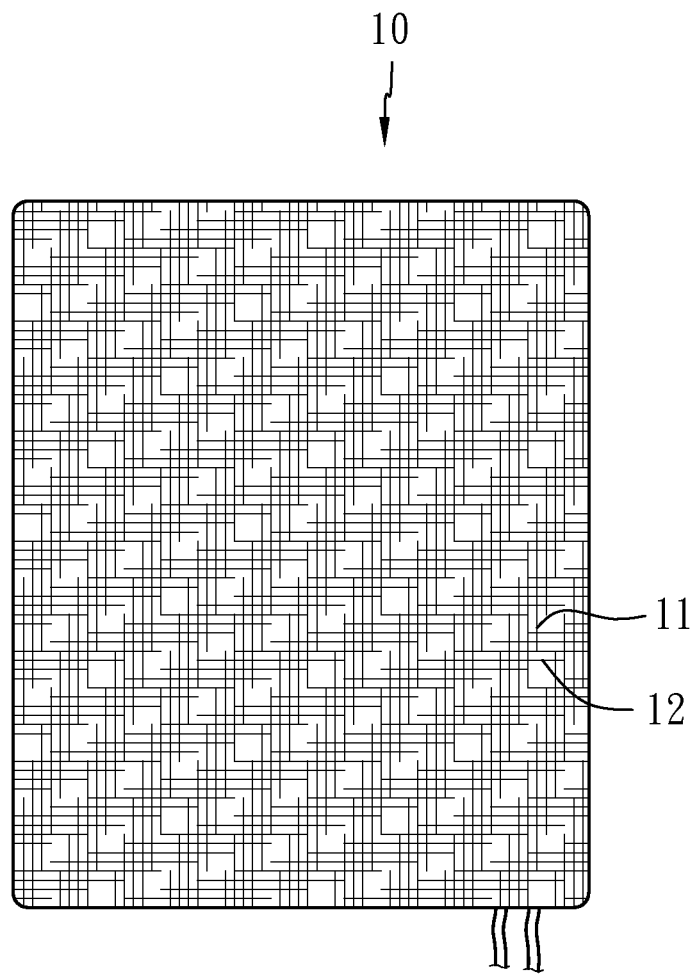
FIG. 1 is a top view of a conventional woven conductive fabric.
Figure 2:
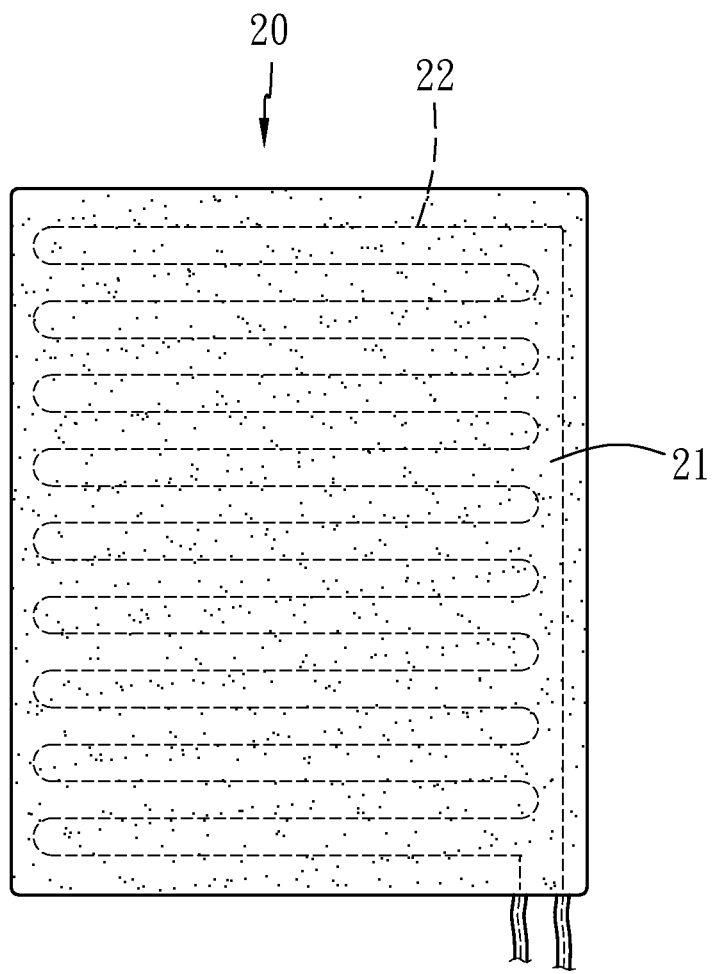
FIG. 2 is a top view of a conventional sewn conductive fabric.
Figure 3:
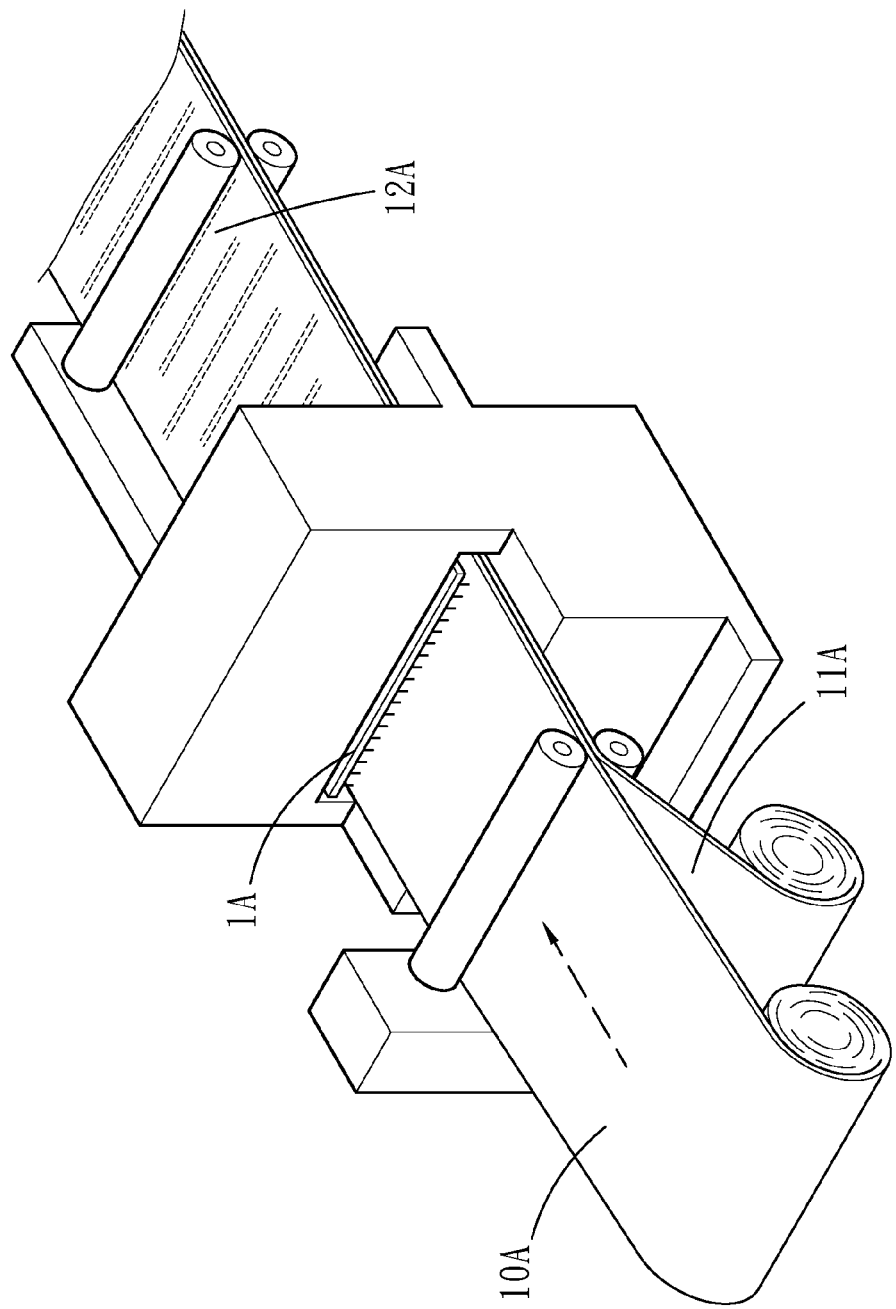
FIG. 3 is a schematic diagram of "Method for Forming Nonwoven Electric Blanket Shells" disclosed by the U.S. Pat. No. 3,431,611.
Figure 4:
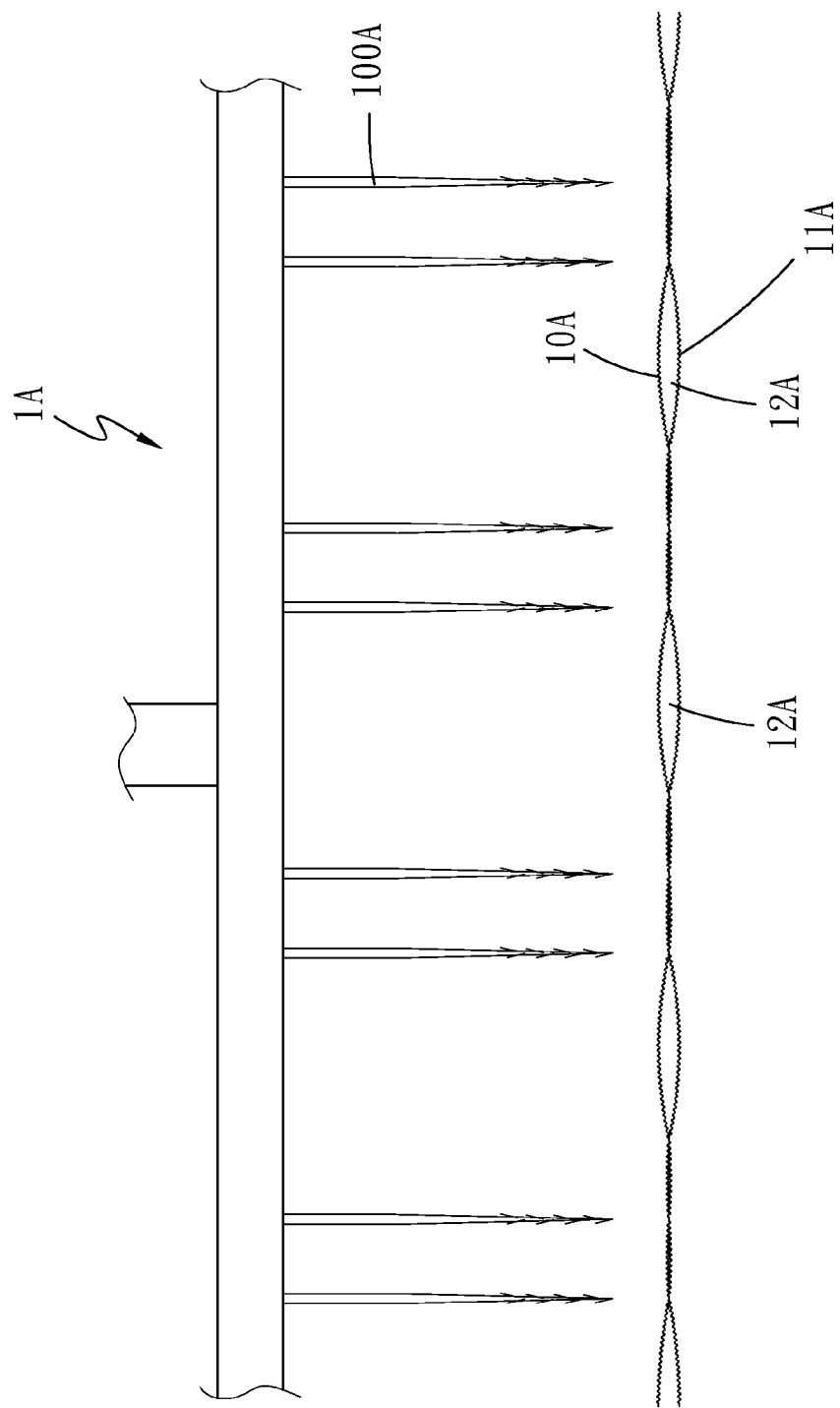
FIG. 4 is a front view of connection of an electric blank shell in FIG. 3.
Figure 5:
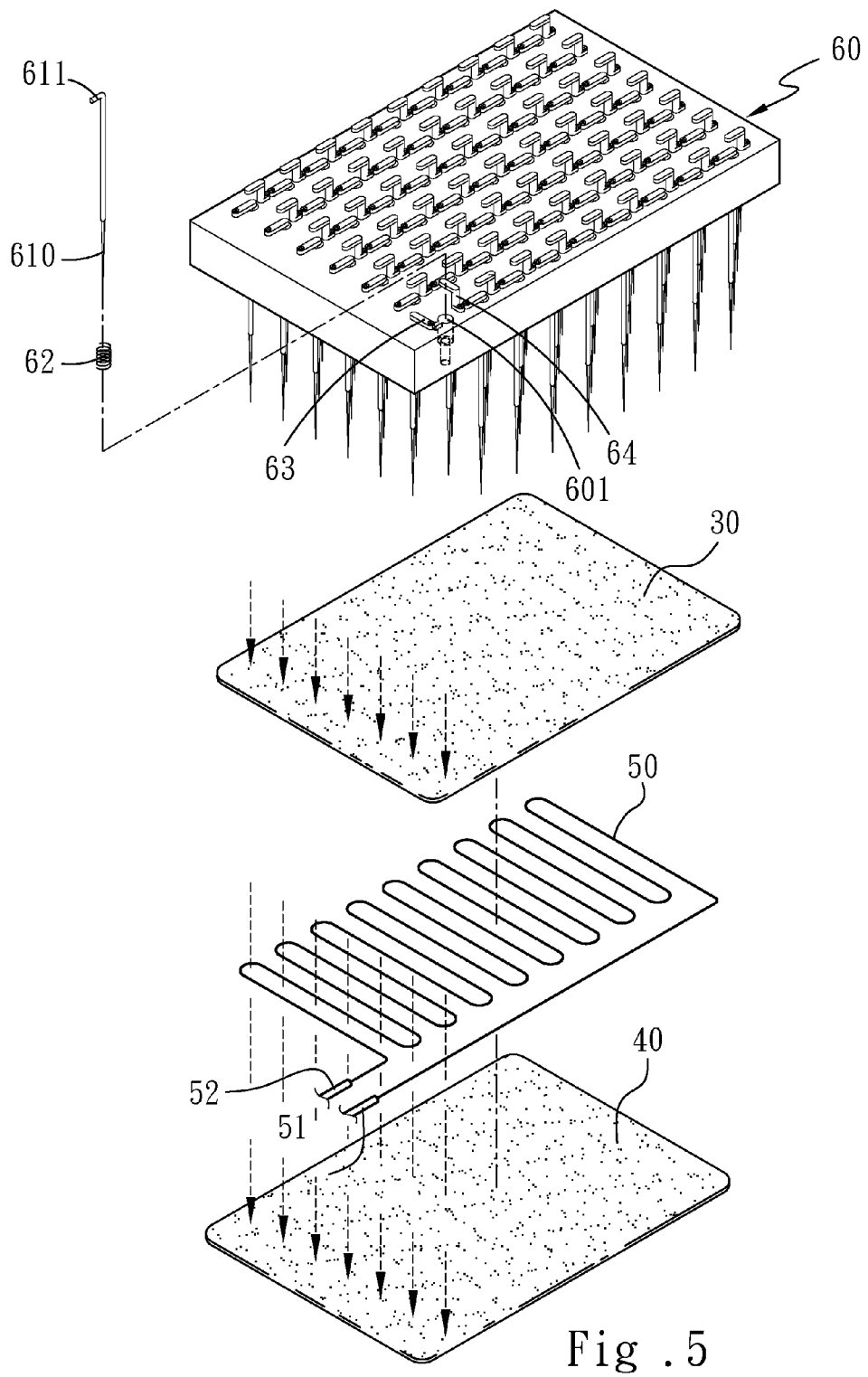
FIG. 5 shows an exploded view of a conductive fabric of the present invention.
Figure 6B:
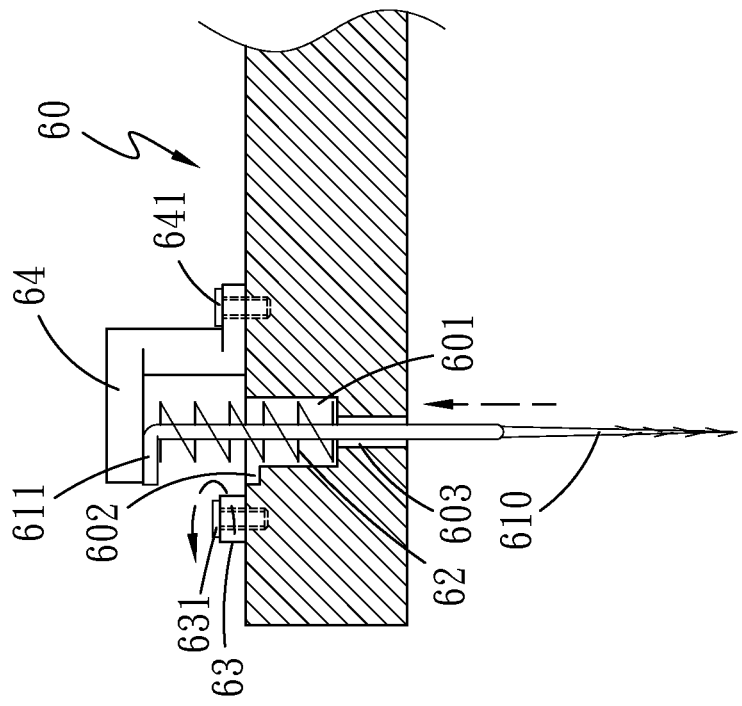
FIG. 6B is a schematic diagram of a fixing device and a retraction operation of a punching needle according to an embodiment of the present invention.
Figure 6A:
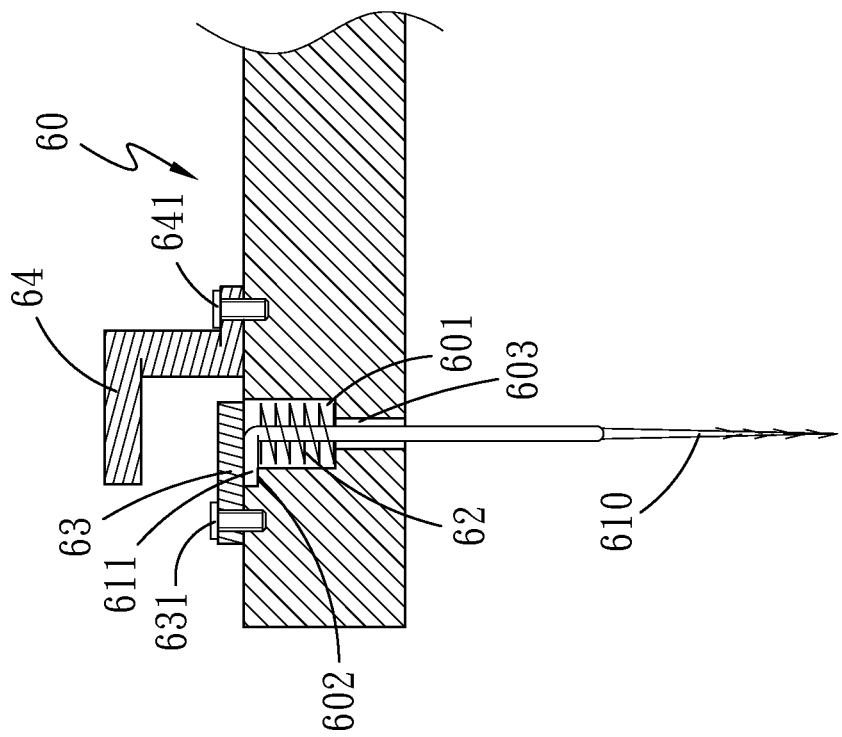
FIG. 6A is a front sectional view of a fixing device and a punching needle extended for fixing according to an embodiment of the present invention.
Figure 6C:
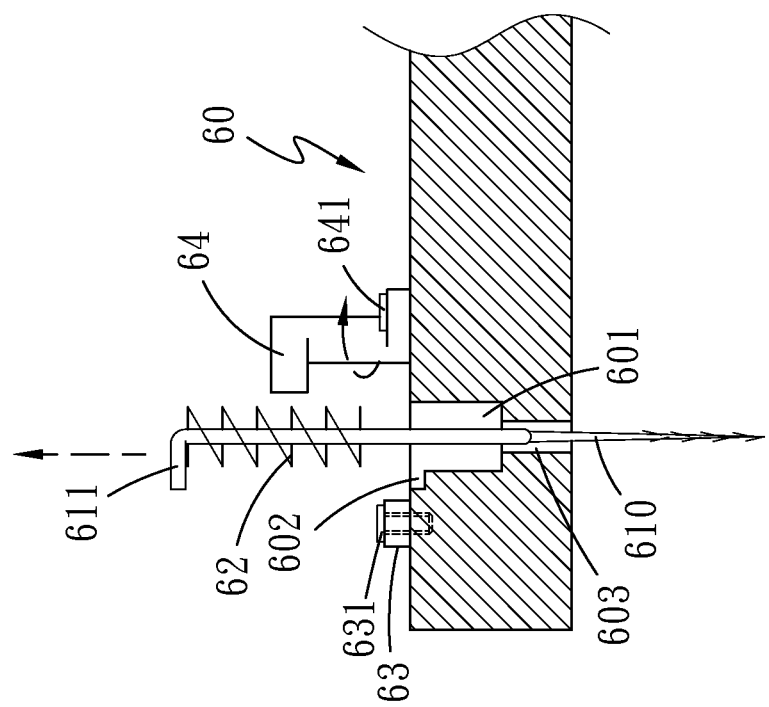
FIG. 6C is a schematic diagram of a fixing device and retraction and replacement operations of a punching needle according to an embodiment of the present invention.
Figure 7:
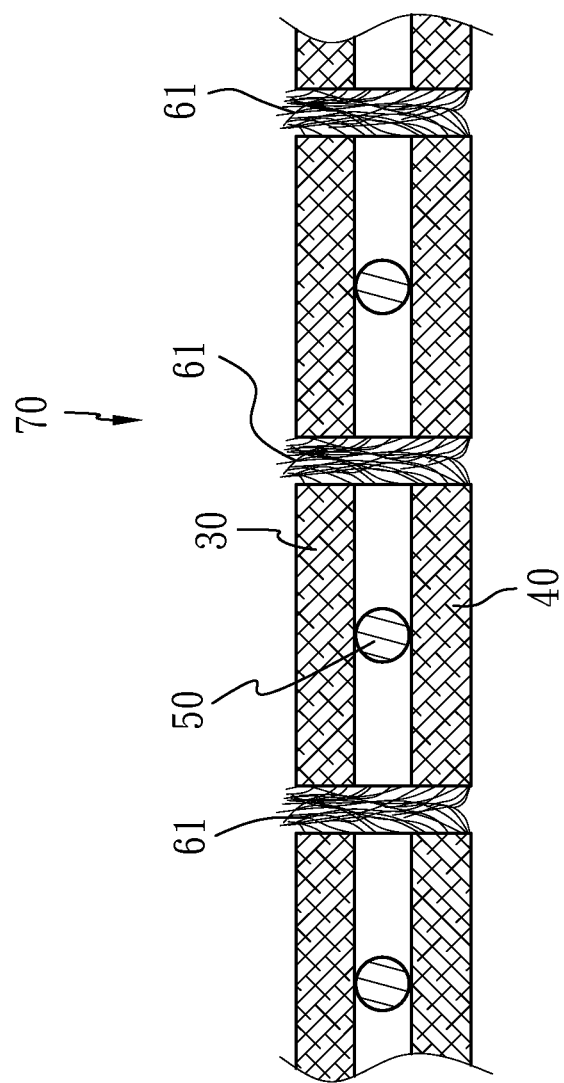
FIG. 7 is a front sectional view of connection of a conductive fabric according to an embodiment of the present invention.

FIG. 5 to FIG. 7 show a method for manufacturing a conductive fabric 70 according to a preferred embodiment of the present invention. A first flexible base 30 and a second flexible base 40, made of a woven fabric or a nonwoven fabric, are disposed as upper and lower layers. The conductive yarn 50 can be a stainless steel fiber yarn, an alloy fiber yarn, a carbon, silver, or copper fiber yarn, and is disposed between the first and second flexible bases 30 and 40. The conductive yarn 50 is placed between the first and second flexible bases 30 and 40 in a symmetrical or asymmetrical arrangement, and has at least one group of electricity connection terminals 51 and 52 extended therefrom. A fixing device 60 having a plurality of working sections 610 is provided. According to the arrangement of the conductive yarn 50 between the first and second flexible bases 30 and 40, the working sections 610 are extended to form fixing points and the other working sections 610 are retracted without forming the fixing points, thereby fixing the conductive yarn 50 with the first and second flexible bases 30 and 40 in the dot-like spaced pattern. At this point, the fixing device 60 is regarded as a needle-punching device. Each of the working sections 610 is a punching needle and forms a protruding portion 611 at a top part thereof. With the needle-punching device, an accommodating channel 601 is provided for accommodating one working section 610. Each accommodating channel 601 has a recess 602 at a top thereof for accommodating a protruding portion 611 at the top of the working section 610, and a slot 603 at a bottom thereof having an inner diameter smaller than that of the accommodating channel 601 and communicating with the accommodating channel 601. The working section 610 runs through the accommodating channel 601 and the slot 603. Further, with an elastic member 62 coupling on the working section 610 in each accommodating channel 601, the working section 610 is controlled for extension and retraction. At one side of the fixing device 60 adjacent to the working section 610, a press block 63 is hinged thereon via a first fixing member 631, so as to control the working section 610 to extend downward or retract upward. At another side of the fixing device 60 far away from the press block 63, a protruding stop block 64 is also hinged thereon via a second fixing member 641, so as to stop the working section 610 when retracting upward (as shown in FIGS. 6A and 6B). Or the protruding stop block 64 is turned loose to change the length of the working section 610. Thus, the fibers of a woven or nonwoven fabric are interwoven to form the fixing points 61 in a dot-like spaced arrangement by the needle-punching device, thereby fixing the conductive yarn 50 between the first and second flexible bases 30 and 40 and providing a method for manufacturing the conductive fabric 70 without damaging the conductive yarn 50.

Further, the conductive yarn 50 is bonded onto either the first flexible base 30 or the second flexible base 40 first in a symmetrical or asymmetrical arrangement, and the remaining second flexible base 40 or first flexible base 30 is covered to the first flexible base 30 or the second flexible base 40 bonded with the conductive yarn 50. According to the arrangement of the conductive yarn 50 between the first and second flexible bases 30 and 40, the working sections 610 of the fixing device 60 are extended to form the fixing points 61 and the other working sections 610 of the fixing device 60 are retracted without forming the fixing points 61, thereby fixing the conductive yarn 50 in a dot-like spaced pattern. As such, the conductive yarn 50 and the first and second flexible bases 30 and 40 as upper and lower layers are combined to achieve the effect of manufacturing the conductive fabrics 70 having the conductive yarns 50 in different arrangements without replacing the fixing device 60.

Figure 8:
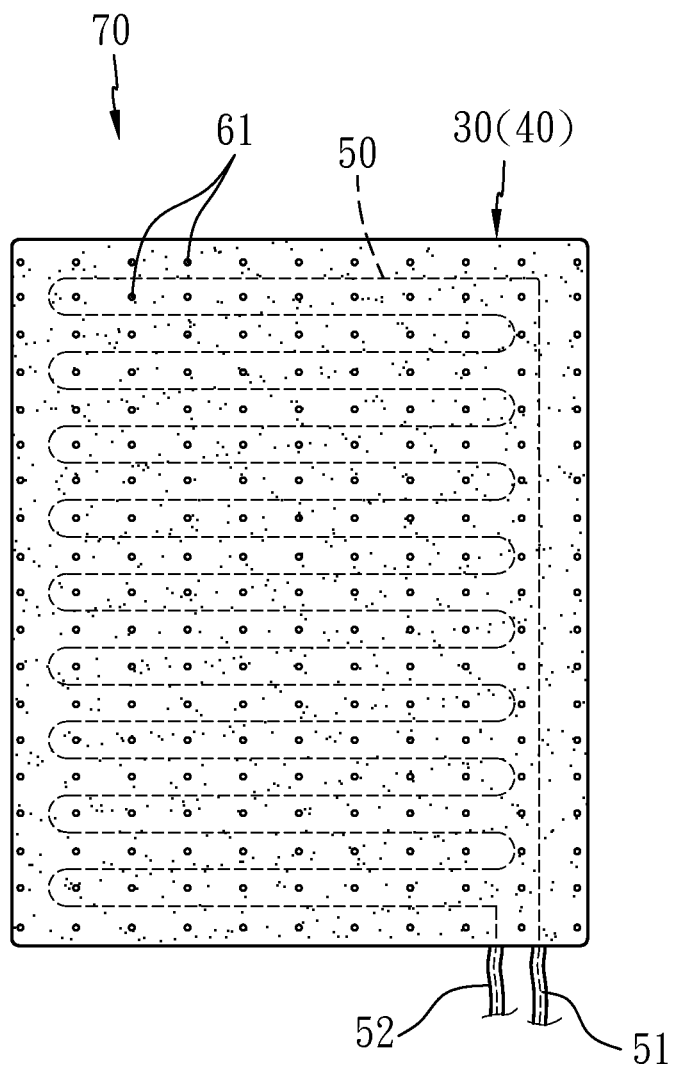
FIG. 8 is a top view showing a regular arrangement of a fixing device according to an embodiment of the present invention.
Figure 9:
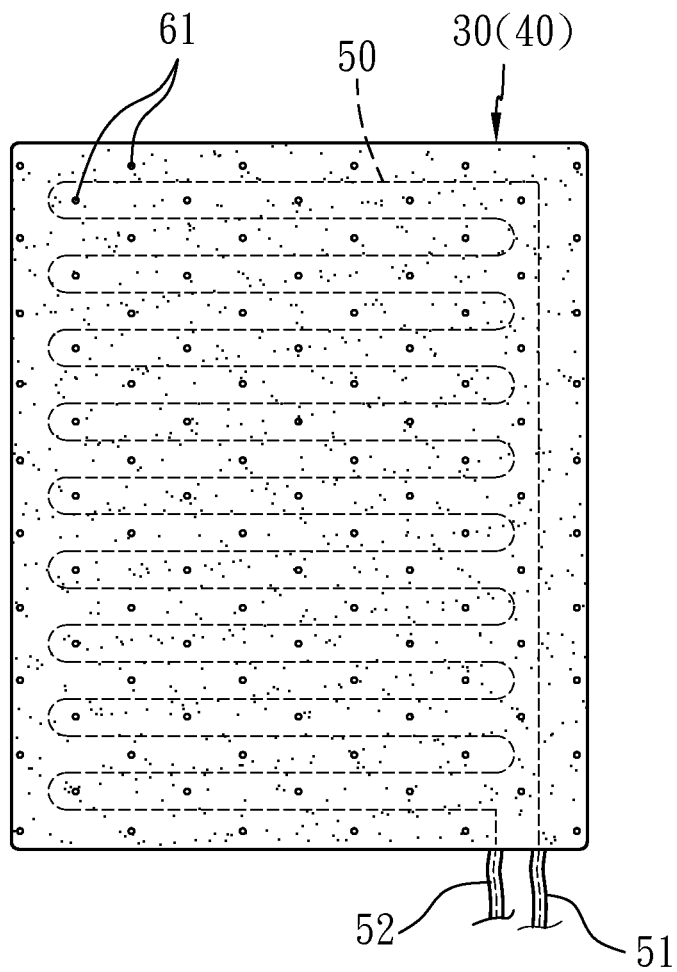
FIG. 9 is a top view showing an irregular arrangement of a fixing device according to an embodiment of the present invention.
Figure 10:
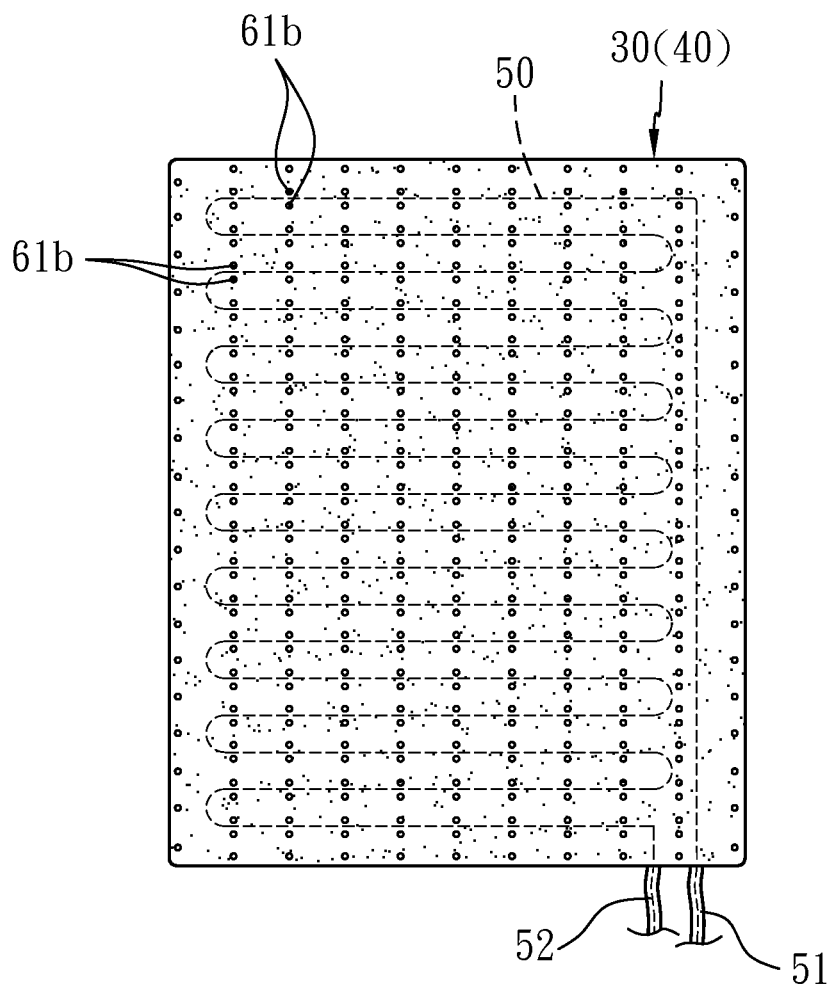
FIG. 10 is a top view of fixing points arranged along a periphery of a conductive yarn according to an embodiment of the present invention.

The working sections 610 (in FIG. 5) of the fixing device 60 form the fixing points 61 in a regular arrangement on the conductive fabric 70, as shown in FIG. 8; or the working sections 610 form the fixing points 61 in an irregular arrangement, as shown in FIG. 9. Alternatively, referring to FIG. 10, the fixing points 61b may be arranged along a periphery of the conductive yarn 50.

Figure 11:
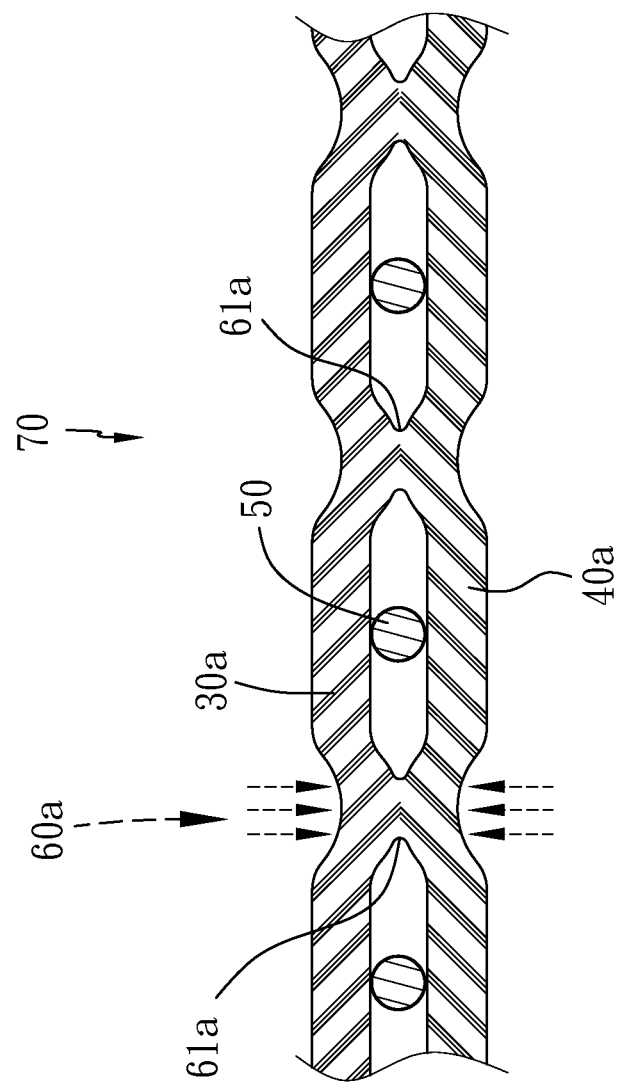
FIG. 11 is a schematic diagram of first and second flexible bases as upper and lower layers of a conductive fabric made of rubber material, synthetic resin or polymer material combined by thermal bonding or thermal pressing according to an embodiment of the present invention.
Figure 12:
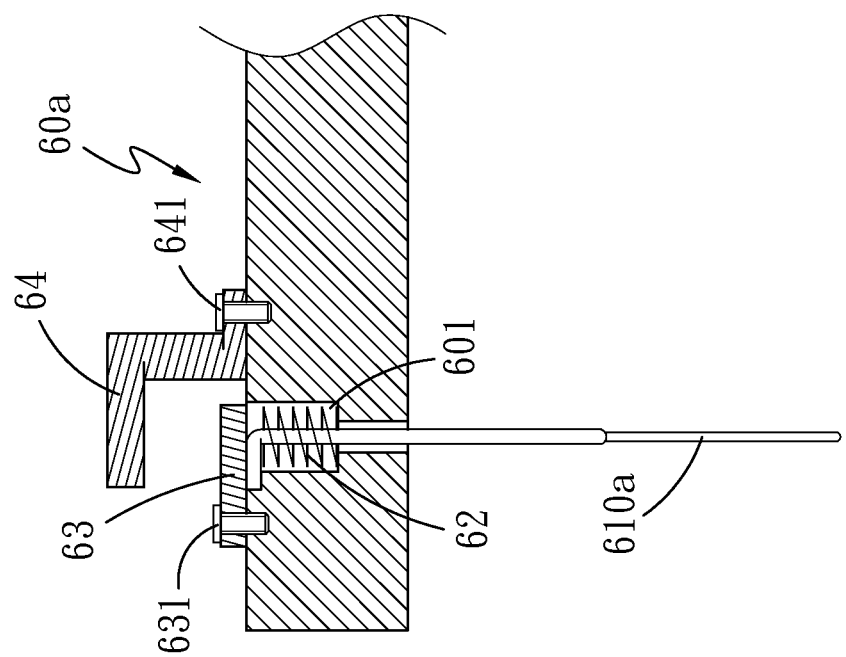
FIG. 12 is a front sectional view of a fixing device implementing thermal bonding or thermal pressing according to an embodiment of the present invention.

Referring to FIGS. 11 and 12, extension and retraction operations of a fixing device 60a according to another embodiment of the present invention are similar to those of the fixing device 60 in FIG. 6A. A main difference of the fixing device 60a from the fixing device 60 is that, the fixing device 60a is a thermal bonding device or thermal pressing device. Working sections 610a of the fixing device 60a are thermal bonding sections or thermal pressing sections that form the fixing points 61a. As such, by utilizing the fixing device 60a that is a thermal bonding device or a thermal pressing device, the first and second flexible bases 30a and 40a, as the upper and lower layers of the conductive fabric 70 and made of rubber material, synthetic resin or polymer material, may be fixed and combined with the conductive yarn 50 to form the fixing points rapidly.

In the method for manufacturing a conductive fabric of the present invention, the conductive yarn 50 is first bonded onto the first flexible base 30, and the second flexible base 40 is covered on the first flexible base 30 bonded with the conductive yarn 50. According to the arrangement of the conductive yarn 50 between the first and second flexible bases 30 and 40, the working sections 610 of the fixing device 60 are extended to form fixing points and the other working sections 610 of the fixing device 60 are retracted without forming the fixing points. As such, the conductive yarn 50 is fixed between the first and second flexible bases 30 and 40, thereby obtaining the conductive fabric products having different conductive yarn arrangements without replacing the fixing device 60.

What is claimed is:

1. A method for manufacturing a conductive fabric, comprising:
    arranging a first flexible base and a second flexible base as an upper layer and a lower layer, respectively;
    providing a conductive yarn between the first and second flexible bases;
    providing a fixing device which includes a plurality of working sections, and extending the working sections to form a plurality of fixing points and retracting the other working sections without forming the fixing points according to an arrangement of the conductive yarn disposed between the first and second flexible bases;
    fixing the conductive yarn between the first and second flexible bases with a dot-like spaced pattern by the extended working sections; and
    wherein the first and second flexible bases are woven or nonwoven fabrics, the fixing device is a needle-punching device, each of the working sections of the needle-punching device is a punching needle, the needle-punching device includes a plurality of accommodating channels each accommodating the punching needle and a plurality of slots each being run through by the punching needle and communicating with the accommodating channel, each punching needle is controlled via an elastic member placed in the accommodating channel and coupling on the punching needle to perform extension and retraction operations, the needle-punching device further includes a plurality of press blocks hinged thereon each being adjacent to the punching needle and turnable to control the extension and retraction operations of the punching needle, and a plurality of protruding stop blocks hinged thereon each being far away from the press block to stop the punching needle when retracting upwards, fibers of the woven or nonwoven fabrics are interwoven to form the fixing points in the dot-like spaced pattern by the needle-punching device.

2. The method of claim 1, wherein the working sections of the fixing device are in a regular or irregular arrangement.

3. The method of claim 1, wherein the fixing points are arranged along a periphery of the conductive yarn.

4. The method of claim 1, wherein the first and second flexible bases are made of rubber material, synthetic resin or polymer material, and the fixing device is a thermal bonding device or thermal pressing device, and each of the working sections of the thermal bonding device or the thermal pressing device is a thermal bonding section or a thermal pressing section.

5. The method of claim 1, wherein the conductive yarn includes at least one group of electricity connection terminal extended therefrom.

6. The method of claim 1, wherein the conductive yarn is a stainless steel fiber yarn, an alloy fiber yarn, a carbon fiber yarn, a silver fiber yarn or a copper fiber yarn.

* * * * *